(12) United States Patent
Yang et al.

(10) Patent No.: US 11,715,865 B2
(45) Date of Patent: Aug. 1, 2023

(54) BATTERY MODULE INCLUDING MODULE BUS BAR

(71) Applicant: LG CHEM, LTD., Seoul (KR)

(72) Inventors: Kun-Joo Yang, Daejeon (KR); Seog-Jin Yoon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 350 days.

(21) Appl. No.: 16/768,840

(22) PCT Filed: Aug. 30, 2019

(86) PCT No.: PCT/KR2019/011203
§ 371 (c)(1),
(2) Date: Jun. 1, 2020

(87) PCT Pub. No.: WO2020/060069
PCT Pub. Date: Mar. 26, 2020

(65) Prior Publication Data
US 2021/0167467 A1      Jun. 3, 2021

(30) Foreign Application Priority Data

Sep. 21, 2018   (KR) .......................... 10-2018-0114299

(51) Int. Cl.
*H01M 50/505* (2021.01)
*H01M 50/522* (2021.01)
(Continued)

(52) U.S. Cl.
CPC ............ *H01M 50/505* (2021.01); *B21D 5/08* (2013.01); *B23K 20/04* (2013.01);
(Continued)

(58) Field of Classification Search
CPC ............. H01M 50/505; H01M 50/522; H01M 50/503; H01M 50/291; H01M 50/213; B21D 5/08; B23K 20/04; B23K 2101/36
See application file for complete search history.

(56) References Cited

U.S. PATENT DOCUMENTS

| 5,418,083 A | 5/1995 | Tamaki et al. | |
| 2005/0079408 A1* | 4/2005 | Hirano | B60L 50/64 |
| | | | 429/174 |

(Continued)

FOREIGN PATENT DOCUMENTS

| CN | 1100564 A | 3/1995 |
| CN | 102189382 A | 9/2011 |

(Continued)

OTHER PUBLICATIONS

International Search Report issued in corresponding International Patent Application No. PCT/KR2019/011203, dated Dec. 27, 2019.

(Continued)

*Primary Examiner* — Jane J Rhee
(74) *Attorney, Agent, or Firm* — Morgan, Lewis & Bockius LLP

(57) ABSTRACT

A battery module includes a plurality of cylindrical battery cells respectively having electrode terminals formed at an upper portion and a lower portion thereof; a module housing including an accommodation portion having a plurality of hollow structures in which the plurality of cylindrical battery cells are inserted and accommodated; and a module bus bar including a first metal plate having a body portion located at an upper portion or a lower portion of the plurality of cylindrical battery cells to extend in a horizontal direction and a plurality of connection portions configured to extend in a horizontal direction from one side of the body portion to contact the electrode terminals of the plurality of cylindrical battery cells, and a second metal plate bonded to the (Continued)

body portion of the first metal plate and having a metal with a relatively higher electric conductivity than the first metal plate.

12 Claims, 6 Drawing Sheets

(51) Int. Cl.
  *H01M 50/503* (2021.01)
  *H01M 50/291* (2021.01)
  *H01M 50/213* (2021.01)
  *B21D 5/08* (2006.01)
  *B23K 20/04* (2006.01)
  *H01M 50/50* (2021.01)
  *H01M 50/296* (2021.01)
  *B23K 101/36* (2006.01)

(52) U.S. Cl.
  CPC ....... *H01M 50/213* (2021.01); *H01M 50/291* (2021.01); *H01M 50/296* (2021.01); *H01M 50/50* (2021.01); *H01M 50/503* (2021.01); *H01M 50/522* (2021.01); *B23K 2101/36* (2018.08)

(56) References Cited

U.S. PATENT DOCUMENTS

| | | | |
|---|---|---|---|
| 2009/0123830 A1 | 5/2009 | Kato et al. | |
| 2012/0231641 A1 | 9/2012 | Sugai et al. | |
| 2012/0321936 A1* | 12/2012 | Song | H01M 50/213 429/159 |
| 2013/0175071 A1 | 7/2013 | Shiba et al. | |
| 2013/0306353 A1 | 11/2013 | Zhao | |
| 2015/0022949 A1 | 1/2015 | Vigneras | |
| 2015/0145482 A1 | 5/2015 | Hurng et al. | |
| 2017/0062789 A1 | 3/2017 | Sim et al. | |

FOREIGN PATENT DOCUMENTS

| | | |
|---|---|---|
| CN | 103827999 A | 5/2014 |
| CN | 203760533 U | 8/2014 |
| CN | 206194879 U | 5/2017 |
| JP | H01-179357 U | 12/1989 |
| JP | 10-134835 A | 5/1998 |
| JP | 2000-036299 A | 2/2000 |
| JP | 2004-127554 A | 4/2004 |
| JP | 2004-171856 A | 6/2004 |
| JP | 2006-261083 A | 9/2006 |
| JP | 3848565 B2 | 11/2006 |
| JP | 4127501 B2 | 7/2008 |
| JP | 2011-113845 A | 6/2011 |
| JP | 2013-143257 A | 7/2013 |
| JP | 3189971 U | 4/2014 |
| KR | 10-2014-0008123 A | 1/2014 |
| KR | 10-2015-0064348 A | 6/2015 |
| KR | 10-1600062 B1 | 3/2016 |
| KR | 10-2016-0069242 A | 6/2016 |
| KR | 10-2016-0086418 A | 7/2016 |
| KR | 10-2017-0025074 A | 3/2017 |

OTHER PUBLICATIONS

Office Action dated May 24, 2021, issued in corresponding Japanese Patent Application No. 2020-526379.
Extended European Search Report dated Dec. 15, 2020, issued in corresponding European Patent Application No. 19863111.1. Note: US 2017/0062789 and JP 2004-127554 cited therein were previously cited.
Office Action dated Jan. 26, 2022, issued in corresponding Chinese Patent Application No. 201980006062.4.

* cited by examiner

BATTERY MODULE INCLUDING MODULE BUS BAR

TECHNICAL FIELD

The present disclosure relates to a battery module including a module bus bar, and more particularly, to a method of manufacturing a battery module to reduce the current loss and improve the manufacturing efficiency.

The present application claims priority to Korean Patent Application No. 10-2018-0114299 filed on Sep. 21, 2018 in the Republic of Korea, the disclosures of which are incorporated herein by reference.

BACKGROUND ART

In recent years, the demand for portable electronic products such as notebooks, video cameras, mobile phones, or the like is rapidly increasing, and the development of electric vehicles, energy storage batteries, robots, satellites, or the like is in earnest. For this reason, high-performance secondary batteries enabling repeated charging and discharging are being actively researched.

Secondary batteries currently commercialized include nickel cadmium batteries, nickel hydrogen batteries, nickel zinc batteries, lithium secondary batteries and so on. Among them, the lithium secondary batteries are more highlighted in comparison to nickel-based secondary batteries due to advantages such as free charging and discharging, caused by substantially no memory effect, very low self-discharge rate, and high energy density.

The lithium secondary battery mainly uses lithium-based oxides and carbonaceous materials as a positive electrode active material and a negative electrode active material, respectively. In addition, the lithium secondary battery includes an electrode assembly in which a positive electrode plate coated with the positive electrode active material and a negative electrode plate coated with the negative electrode active material are disposed with a separator being interposed therebetween, and an exterior hermetically containing the electrode assembly together with an electrolyte.

In using the secondary battery, it is very important to check the temperature, current and voltage of the secondary battery in terms of preventing the occurrence of safety accidents and improving the secondary battery life.

In other words, as the performance of electronic devices improves day by day, the performance of secondary batteries for supplying a high output power at one time is also improving. In particular, since the secondary batteries used in the high-power electronic devices generate a large amount of heat, an accident such as ignition or explosion may be caused if the temperature rise is not properly handled.

To this end, a battery management unit applied to the electronic device may include a negative temperature coefficient (NTC) device, a positive temperature coefficient device (PTC) element, or the like as a temperature element used for measuring the temperature of a plurality of secondary batteries.

In addition, the conventional battery module includes an electrically conductive bus bar plate for electrically connecting the plurality of secondary batteries in series or in parallel. Further, generally, the bus bar plate is electrically connected to the battery management unit to control charging and discharging of the plurality of secondary batteries or to transfer the power of the plurality of secondary batteries to an external electronic device through an external input/output terminal.

Recently, the bus bar plate provided to the battery module uses a material with a relatively high electric resistance in order to increase the weldability of resistance welding with an electrode terminal.

However, the bus bar plate with a high electric resistance may be a factor that increases a current loss in transmitting the current generated in the secondary battery to an external device, thereby deteriorating the energy efficiency. In addition, as the material has a higher electric resistance, the thermal conductivity is lowered, which may reduce the heat dissipation performance of the battery module to the bus bar plate is applied.

On the contrary, if the bus bar plate uses a material with a low electric resistance, when the electrode terminal and the bus bar plate are bonded by means of resistance welding, it is difficult to generate sufficient resistance heat, resulting in poor weldability and long welding time. Accordingly, the manufacturing cost increases and the durability of the battery module deteriorates.

Further, if a thick metal plate is used to reduce electric resistance, it takes a long time to raise the welding temperature of the thick metal plate above a predetermined temperature, and a lot of heat sources must be added. Thus, it is very difficult to directly bond a cylindrical battery cell and a thick metal plate in by means of resistance welding.

DISCLOSURE

Technical Problem

The present disclosure is designed to solve the problems of the related art, and therefore the present disclosure is directed to providing a battery module, which may reduce the current loss and improve the manufacturing efficiency.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module, comprising:

a plurality of cylindrical battery cells respectively having electrode terminals formed at an upper portion and a lower portion thereof;

a module housing including an accommodation portion having a plurality of hollow structures in which the plurality of cylindrical battery cells are inserted and accommodated; and a module bus bar including a first metal plate having a body portion located at an upper portion or a lower portion of the plurality of cylindrical battery cells to extend in a horizontal direction and a plurality of connection portions configured to extend in a horizontal direction from one side of the body portion to contact the electrode terminals of the plurality of cylindrical battery cells, and a second metal plate bonded to the body portion of the first metal plate and having a metal with a relatively higher electric conductivity than the first metal plate.

Also, the second metal plate may be bonded to the body portion of the first metal plate by cladding.

Moreover, a coupling protrusion protruding toward the body portion of the first metal plate may be formed at an outer surface of the second metal plate facing the body portion of the first metal plate.

In addition, a coupling groove dented inward may be formed at the body portion of the first metal plate so that the coupling protrusion is inserted and fixed therein.

Further, an insert portion having a support wall protruding outward may be formed at the body portion of the first metal plate so that at least a portion of the second metal plate is inserted therein.

Also, an accommodation groove dented in an inner direction of the body portion may be formed at the second metal plate to surround at least a portion of the body portion of the first metal plate.

Moreover, the connection portion of the first metal plate may have a relatively smaller thickness than the second metal plate.

In addition, the module bus bar may further include a third metal plate having a bonding portion bonded to an outer surface of the second metal plate and a plurality of connection extensions extending in a horizontal direction from one side of the bonding portion to contact the electrode terminals of the plurality of cylindrical battery cells.

Also, the connection portion of the first metal plate and the connection extension of the third metal plate may be disposed to be spaced apart by a predetermined distance.

Moreover, the second metal plate may have a protrusion configured to protrusively extend outward from the body portion of the first metal plate, and a fixing groove may be formed at the protrusion so that an external input/output terminal is inserted and fixed therein.

In addition, the module housing may have a mounting portion formed at an outer side thereof so that the module bus bar is mounted thereto. Further, a hook structure may be formed at the mounting portion to press and fix the module bus bar mounted on the mounting portion inward.

Also, in another aspect of the present disclosure, there is also provided a battery pack, comprising at least two battery modules according to the present disclosure.

Further, in another aspect of the present disclosure, there is also provided an device, comprising the battery pack according to the present disclosure.

In addition, in another aspect of the present disclosure, there is also provided a method for manufacturing a module bus bar, comprising:

a shaping step of shaping a first metal plate by rolling a body portion extending in a direction along which a plurality of cylindrical battery cells are arranged and a connection portion configured to electrically connect the plurality of cylindrical battery cells by using a pressing roller;

a bonding step of rolling a second metal plate having a higher electric conductivity than the first metal plate on the body portion of the first metal plate at a predetermined temperature to be bonded thereto by cladding; and a punching step of punching the body portion of the first metal plate by using a die to form the connection portion extending in a horizontal direction therefrom.

Further, in the bonding step, a coupling protrusion formed at the second metal plate to protrude toward the first metal plate may be inserted into and coupled to the body portion of the first metal plate.

Also, the method may further comprise a forming step of forming an external input/output terminal of the second metal plate by punching using a die.

Advantageous Effects

According to an embodiment of the present disclosure, in the battery module of the present disclosure, since the second metal plate has a metal with a higher electric conductivity than the metal of the first metal plate, it is possible to reduce the current loss of the module bus bar, thereby reducing the power loss of the battery module. Moreover, the second conductive metal plates with a higher electric conductivity has a relatively higher thermal conduction rate and a faster cooling rate than the first metal plate. As a result, this helps the heat dissipation of the battery module to greatly increase the cooling efficiency of the battery module.

In addition, according to another embodiment of the present disclosure, since the second metal plate is clad-bonded to the body portion of the first metal plate, the electrical connection between the second metal plate and the body portion of the first metal plate is very excellent, and the bonding (coupling) between the second metal plate and the body portion of the first metal plate is excellent, thereby preventing the durability of the module bus bar from being weakened.

Moreover, according to another embodiment of the present disclosure, since a coupling protrusion is formed on the outer surface of the second metal plate and a coupling groove formed at the body portion of the first metal plate, the second metal plate may be bonded to the body portion of the first metal plate with a strong bonding force. In particular, when bonding the second metal plate on the body portion of the first metal plate by rolling, the coupling protrusion may have an increased contact area with the second metal plate, when compared with the module bus bar of FIG. 3, thereby exhibiting a high coupling force and allowing relatively well metal mingling at the bonding portion.

In addition, according to another embodiment of the present disclosure, since an insert portion having a support wall is formed at the body portion of the first metal plate, the second metal plate may be primarily placed and fixed thereto. In particular, when bonding the second metal plate on the body portion of the first metal plate by rolling, the protrusion of the insert portion may be stably supported and fixed so that the second metal plate is bonded in place. Further, when compared with the module bus bar of FIG. 3, the insert portion may increase the contact area with the second metal plate, thereby ensuring the high bonding force and reducing the electric resistance that may occur at the bonding portion.

Also, according to an embodiment of the present disclosure, since an accommodation groove dented in the inner direction of the body is formed at the second metal plate, the second metal plate may be stably placed and coupled. In particular, when bonding the second metal plate on the body portion of the first metal plate by rolling, the second metal plate may be primarily fixed on the body portion of the first metal plate before the second metal plate is bonded in place, thereby facilitating the bonding process.

Moreover, according to another embodiment of the present disclosure, since the connection portion of the first metal plate is configured to have a thin thickness, the welding between the connection portion and the electrode terminal of the cylindrical battery cell may be performed quickly at a low process temperature. That is, during resistance welding, as the connection portion is thinner, the connection portion may be quickly melted at a lower temperature, compared to a thick connection portion. Accordingly, the efficiency of the manufacturing process may be increased, and the failure of the cylindrical battery cell according to the welding temperature may be minimized.

In addition, according to another embodiment of the present disclosure, when the connection portion of the first metal plate and the connection extension of the third metal plate are disposed to be spaced apart at a predetermined distance so as to be resistance-welded to the electrode terminals of the cylindrical battery cell, compared with the current path between the connection portions of the first metal plate, the current path between the connection portion of the first metal plate and the connection extension of the third metal plate is longer and the electric resistance is higher, so that the current may be concentrated in the current path from the connection portion of the first metal plate to the electrode terminal of the cylindrical battery cell and the connection extension of the third metal plate. Accordingly, the resistance welding between the module bus bar and the electrode terminal may be efficiently performed. In addition, it is possible to shorten the manufacturing time and to manufacture a battery module with excellent weldability.

Further, according to another embodiment of the present disclosure, when the protrusion is formed such that the external input/output terminal is coupled to the second metal plate rather than the first metal plate, power may be transmitted to an electronic device through the second metal plate having a relatively higher electric conductivity than the first metal plate, thereby minimizing the loss of power supplied from the battery module. In addition, since the second metal plate has more excellent heat dissipation characteristics than the first metal plate, the second metal plate is more advantageous for dissipating the heat generated in the external input/output terminal to the outside.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
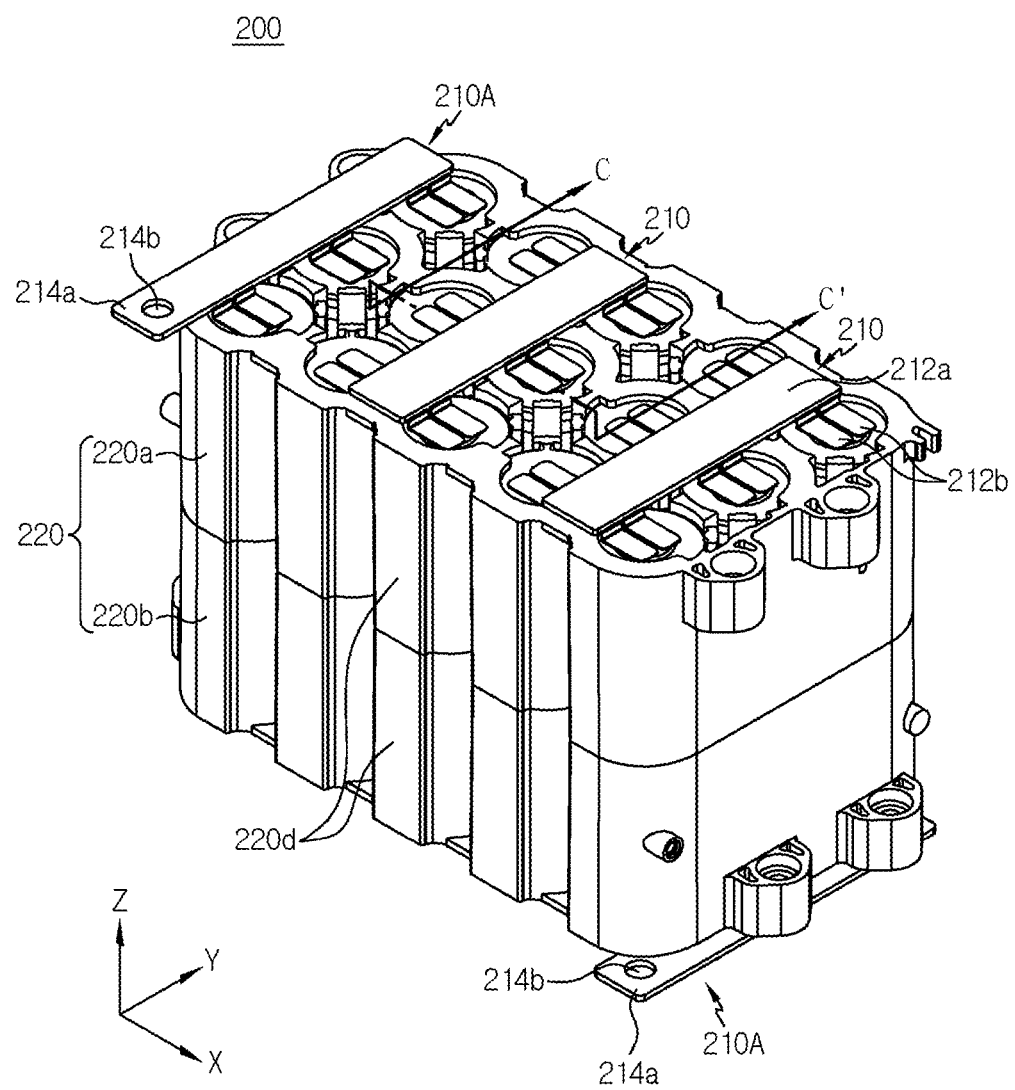
FIG. 1 is a perspective view schematically showing components of a battery module according to an embodiment of the present disclosure.

FIG. 1 is a perspective view schematically showing components of a battery module according to an embodiment of the present disclosure. Also, FIG. 2 is an exploded perspective view schematically showing exploded components of the battery module according to an embodiment of the present disclosure.

Figure 2:
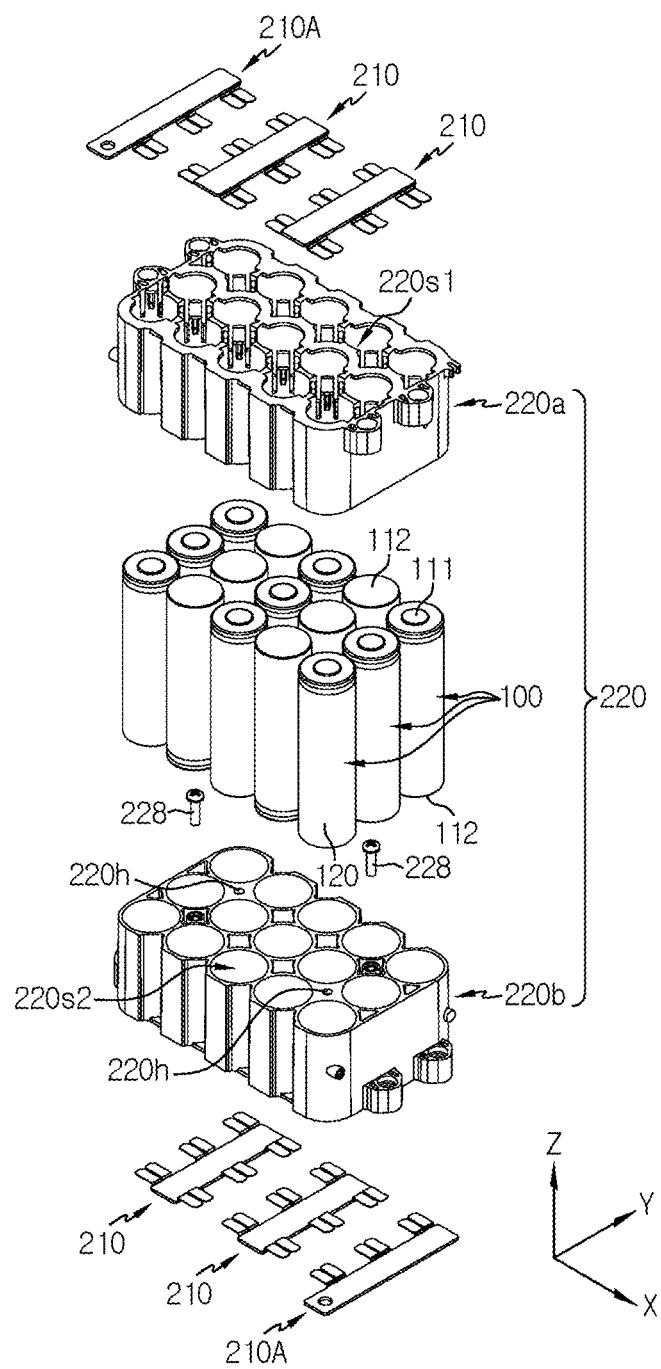
FIG. 2 is an exploded perspective view schematically showing exploded components of the battery module according to an embodiment of the present disclosure.

Referring to FIGS. 1 and 2, a battery module 200 according to an embodiment of the present disclosure may include a plurality of cylindrical battery cells 100, a module housing 220, and a module bus bar 210.

Here, the cylindrical battery cell 100 may include a cylindrical battery can 120 and an electrode assembly (not shown) accommodated in the battery can 120.

Also, the battery can 120 may include a material with high electrical conductivity. For example, the battery can 120 may include aluminum, or copper.

Moreover, the battery can 120 may be configured to stand long in a vertical direction. In addition, the battery can 120 may have a cylindrical shape extending in the vertical direction. Further, an electrode terminal 111 and an electrode terminal 112 may be formed at an upper portion and a lower portion of the battery can 120, respectively. Specifically, a positive electrode terminal 111 may be formed at a flat circular top surface of the upper end of the battery can 120, and a negative electrode terminal 112 may be formed at a bottom flat surface of the lower end of the battery can 120.

Further, the cylindrical battery cell 100 may be arranged in a plurality of columns and rows in a horizontal direction. Here, the horizontal direction may mean a direction parallel to the ground when the cylindrical battery cell 100 is placed on the ground, and may also be referred to as at least one direction on a plane perpendicular to the vertical direction. Also, the horizontal direction may refer to X and Y directions of FIG. 1. For example, as shown in FIG. 2, the battery module 200 may include a plurality of cylindrical battery cells 100 arranged in five rows in a left and right direction (x direction) and three rows in a front and rear direction (y direction).

In addition, an electrode assembly (not shown) may be formed such that a positive electrode and a negative electrode are wound in a jelly-roll form with a separator being interposed therebetween. Further, a positive electrode tab may be attached to the positive electrode (not shown) to be connected to a positive electrode terminal 111 at the upper end of the battery can 120. A negative electrode tab may be attached to the negative electrode (not shown) to be connected to a negative electrode terminal 112 at the lower end of the battery can 120.

Meanwhile, the module housing 220 may have accommodation portions 220s1, 220s2 in which the cylindrical battery cell 100 may be inserted and accommodated. Specifically, the accommodation portions 220s1, 220s2 may have a plurality of hollow structures formed to cover an outer surface of the cylindrical battery cell 100. In this case, the module housing 220 may have an electrically insulating material. For example, the electrically insulating material may be a polymer plastic. More specifically, the electrically insulating material may be polyvinyl chloride (PVC).

Also, referring to FIG. 1, the module housing 220 may include an outer wall 220*d* provided at front, rear, left and right sides to form an inner space therein. In addition, referring to FIG. 2, the upper case 220*a* and the lower case 220*b* may have a perforated hole 220*h* so that a fastening bolt 228 is inserted therein.

For example, as shown in FIG. 1, the upper case 220*a* and the lower case 220*b* of the module housing 220 may respectively have a perforated hole 220*h* into which the bolt 228 is inserted and fixed. Accordingly, the upper case 220*a* and the lower case 220*b* may be fastened and coupled by means of the bolt 228 inserted into the perforated hole 220*h*.

Figure 3:
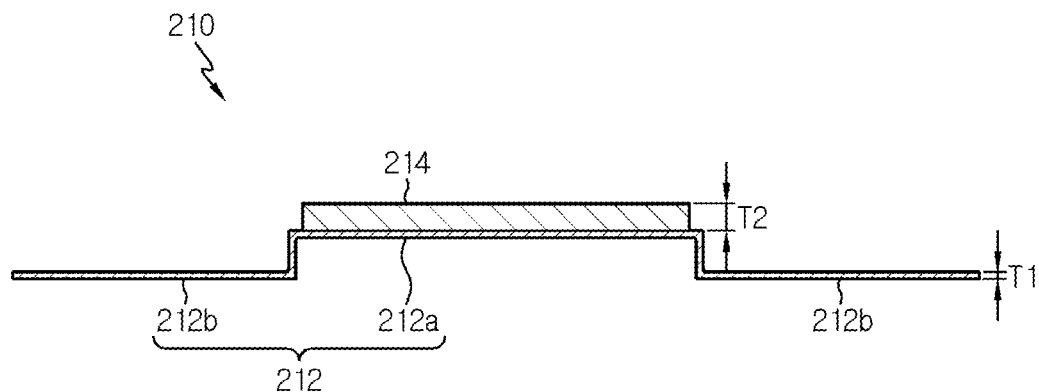
FIG. 3 is a schematic sectional view showing a module bus bar, taken along the line C-C' of FIG. 1.

Meanwhile, referring to FIGS. 1 to 3, the module bus bar 210 may be configured to electrically connect the plurality of cylindrical battery cells 100. For example, the module bus bar 210 may be configured to electrically connect the plurality of cylindrical battery cells 100 in series. Alternatively, the module bus bar 210 may be configured to electrically connect the plurality of cylindrical battery cells 100 in parallel. The module bus bar 210 may have a metal with excellent electric conductivity.

In addition, the module bus bar 210 may include a first metal plate 212 and a second metal plate 214. Specifically, the first metal plate 212 may have a body portion 212*a* located at an upper portion or a lower portion of the plurality of cylindrical battery cells 100 to extend in a horizontal direction. Further, the body portion 212*a* may be disposed between the plurality of cylindrical battery cells 100 arranged in two rows. The body portion 212*a* may have a rectangular plate shape with a predetermined thickness.

Also, the first metal plate 212 may have a plurality of connection portions 212*b* respectively extending in a horizontal direction from both sides of the body portion 212*a* to contact the electrode terminals 111 of the plurality of cylindrical battery cells 100 from one side of the body portion 212*a*. That is, the connection portion 212*b* may be formed to extend from a side of the body portion 212*a* in the horizontal direction (the x direction of FIG. 1) to contact an upper surface of the electrode terminals 111 of the plurality of cylindrical battery cells 100.

For example, as shown in FIG. 3, the module bus bar 210 may include one first metal plate 212. In addition, the first metal plate 212 may have a body portion 212*a* located on the upper or lower portion of the plurality of cylindrical battery cells 100 to extend in a horizontal direction (the x direction of FIG. 1) and a plurality of connection portions 212*b* extending in a horizontal direction to contact the electrode terminals 111 of the plurality of cylindrical battery cells 100 from one side of the body portion 212*a*.

Further, according to one aspect of the present disclosure, the connection portion 212*b* of the module bus bar 210 in electrical contact with the electrode terminal 111 of the cylindrical battery cell 100 may be formed to be branched to two regions. In this case, during the welding process between the connection portion 212*b* and the electrode terminals 111, the thermal conductivity for welding heating may be effectively increased through a gap of the branched structure, thereby shortening the welding time and improving the welding reliability.

In addition, the second metal plate 214 may be bonded to the body portion 212*a* of the first metal plate 212. Further, the second metal plate 214 may have a rectangular plate shape, similar to the body portion 212*a* of the first metal plate 212. For example, as shown in FIG. 3, the second metal plate 214 may be bonded onto the body portion 212*a* of the first metal plate 212. Thus, the second metal plate 214 may have a rectangular plate shape extending along the extending direction of the body portion 212*a*.

Also, the second metal plate 214 may have a metal with a relatively higher electric conductivity than the first metal plate 212. Specifically, the second metal plate 214 may be made of a metal with a relatively higher electric conductivity than the first metal plate 212. Moreover, the second metal plate 214 may be configured to have a relatively higher electrical conductivity than the first metal plate 212.

For example, the first metal plate 212 may have a nickel material, and the second metal plate 214 may have a copper material. However, without being limited to the above, the first metal plate 212 and the second metal plate 214 may be made of any metal alloy mainly containing nickel, gold, silver or the like, if the second metal plate 214 may be configured to have a relatively higher electrical conductivity than the first metal plate 212.

In other words, the first metal plate 212 may have a metal with a relatively higher resistivity than the second metal plate 214. For example, the metal with high resistivity may be nickel.

Thus, according to this configuration of the present disclosure, since the second metal plate 214 has a metal with a relatively higher electric conductivity than the metal of the first metal plate 212, it is possible to reduce the current loss of the module bus bar 210 and the power loss of the battery module 200. Moreover, the second metal plate 214 with a higher electric conductivity has a relatively higher thermal conductivity and a faster cooling rate than the first metal plate 212. Accordingly, this helps the heat dissipation of the battery module 200, thereby greatly increasing the cooling efficiency of the battery module 200.

On the contrary, since the first metal plate 212 has a metal with a higher resistivity than the second metal plate 214, when the connection portion 212*b* of the first metal plate 212 is resistance-welded with the electrode terminal 111 of the cylindrical battery cell 100, high resistance heat may be generated at the welding portion due to the high resistivity metal, thereby improving the efficiency of the welding process.

In addition, the connection portion 212*b* may be branched into two regions. That is, the connection portion 212*b* may have a form in which a gap of a predetermined distance is formed between two branched plate shapes. For example, as shown in FIG. 1, the connection portion 212*b* may be formed to protrude in a horizontal direction to have a form branched into two regions (a separated structure) from the body portion 212*a* of the first metal plate 212.

Meanwhile, referring to FIG. 3 again, the second metal plate 214 may be bonded to the body portion 212*a* of the first metal plate 212 by cladding. Here, the portion where the body portion 212*a* of the second metal plate 214 and the first metal plate 212 is bonded by cladding may be in a state where the metal of the second metal plate 214 and the metal of the body portion 212*a* of the first metal plate 212 are bonded to each other.

That is, in the process of rolling and bonding the second metal plate 214 and the body portion 212*a* of the first metal plate 212 to each other at a predetermined temperature, a part of the metal of the second metal plate 214 and a part of the metal of the body portion 212*a* of the first metal plate 212 may be coupled and mingled with each other.

Thus, according to this configuration of the present disclosure, since the second metal plate 214 is bonded to the body portion 212a of the first metal plate 212 by cladding, the electrical connection between the second metal plate 214 and the body portion 212a of the first metal plate 212 is very excellent, and the bonding (coupling) between the second metal plate 214 and the body portion 212a of the first metal plate 212 is excellent, thereby preventing the durability of the module bus bar 210 from being weakened.

Figure 4:
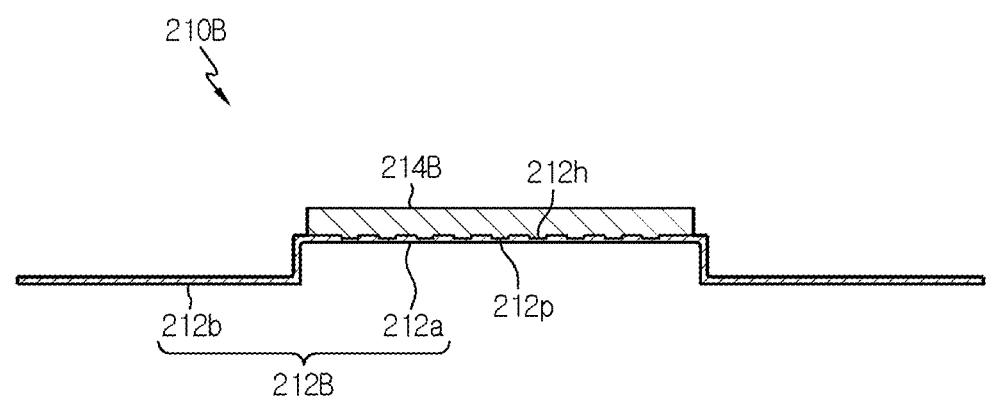
FIG. 4 is a sectional view schematically showing a module bus bar of the battery module according to another embodiment of the present disclosure.

FIG. 4 is a sectional view schematically showing a module bus bar of the battery module according to another embodiment of the present disclosure.

Referring to FIG. 4, a module bus bar 210B according to another embodiment may have a coupling protrusion 212p protruding toward the body portion 212a of the first metal plate 212B and formed at an outer surface of the second metal plate 214B facing the body portion 212a of the first metal plate 212B. In addition, the coupling protrusion 212p may have an uneven structure.

However, the shape of the coupling protrusion 212p is not limited to the uneven structure, and any shape may be applied as long as the coupling protrusion 212p may be inserted into and fixed to the body portion 212a of the first metal plate 212B to increase the coupling force therebetween.

Further, a coupling groove 212h dented inward may be formed at the body portion 212a of the first metal plate 212B so that the coupling protrusion 212p is inserted and fixed therein. Specifically, the coupling groove 212h may have a dented structure corresponding to the outer shape of the coupling protrusion 212p.

For example, as shown in FIG. 4, nine coupling protrusions 212p protruding downward may be formed on the outer surface of the second metal plate 214B facing the body portion 212a of the first metal plate 212B. In addition, nine coupling grooves 212h dented inward in a shape corresponding to the nine coupling protrusions 212p may be formed at the body portion 212a of the first metal plate 212B.

Thus, according to this configuration of the present disclosure, since the coupling protrusion 212p is formed on the outer surface of the second metal plate 214B and the coupling groove 212h is formed at the body portion 212a of the first metal plate 212B, the second metal plate 214B may be bonded to the body portion 212a of the first metal plate 212B with a strong bonding force. In particular, when the second metal plate 214B is bonded onto the body portion 212a of the first metal plate 212B by rolling, the coupling protrusion 212p may have an increased contact area (bonding area) with the second metal plate 214B, compared to the module bus bar 210 of FIG. 3, thereby exhibiting a high bonding strength and allowing relatively good metal mingling at the bonding portion.

Figure 5:
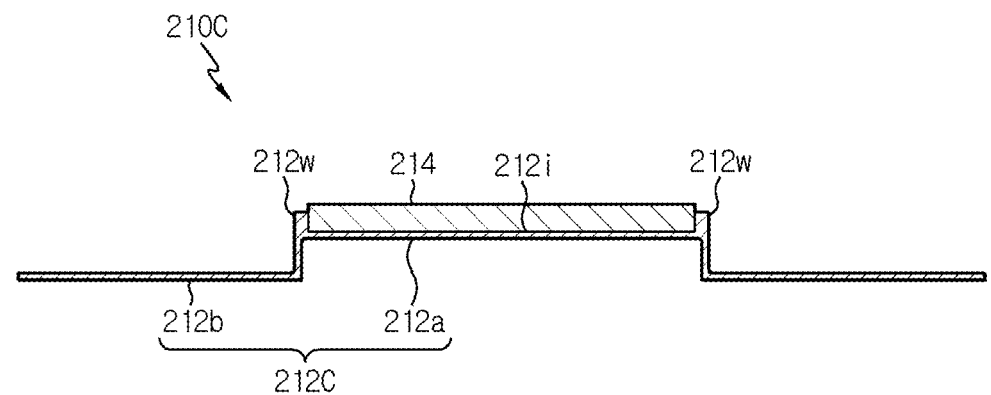
FIG. 5 is a sectional view schematically showing a module bus bar of the battery module according to still another embodiment of the present disclosure.

FIG. 5 is a sectional view schematically showing a module bus bar of the battery module according to still another embodiment of the present disclosure.

Referring to FIG. 5, a module bus bar 210C according to another embodiment may have an insert portion 212i formed at the body portion 212a of the first metal plate 212C so that at least a portion of the second metal plate 214 is inserted therein. Specifically, the insert portion 212i may have a support wall 212w protruding outward.

For example, as shown in FIG. 5, an insert portion 212i having an insertion space may be formed at the body portion 212a of the first metal plate 212C so that a portion of the second metal plate 214 is inserted therein. In addition, two support walls 212w protruding upward may be formed at the insert portion 212i to support both horizontal sides of the second metal plate 214.

Thus, according to this configuration of the present disclosure, since the insert portion 212i having the support wall 212w is formed at the body portion 212a of the first metal plate 212C, the second metal plate 214 may be primarily placed and fixed. In particular, when rolling the second metal plate 214 on the body portion 212a of the first metal plate 212C, the protrusion of the insert portion 212i may be stably supported and fixed so that the second metal plate 214 is bonded in place. Moreover, since the insert portion 212i may increase the contact area with the second metal plate 214, compared to the module bus bar 210 of FIG. 3, it is possible to ensure the high bonding force and reduce the electric resistance that may occur at the bonding portion.

Figure 6:
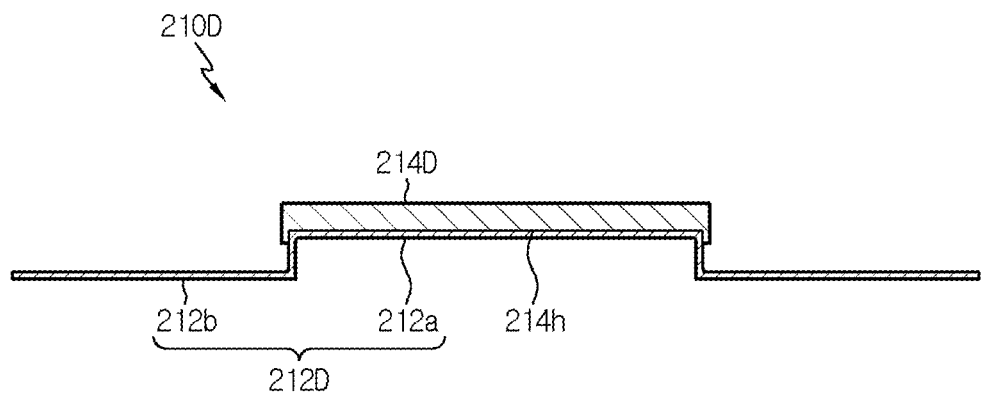
FIG. 6 is a sectional view schematically showing a module bus bar of the battery module according to still another embodiment of the present disclosure.

FIG. 6 is a sectional view schematically showing a module bus bar of the battery module according to still another embodiment of the present disclosure.

Referring to FIG. 6, a second metal plate 214D included in a module bus bar 210D according to another embodiment may have an accommodation groove 214h dented in an inner direction of the body portion. Specifically, the accommodation groove 214h may have an inner space capable of surrounding at least a portion of the body portion 212a of the first metal plate 212D. For example, as shown in FIG. 6, the accommodation groove 214h dented inward may be formed at the second metal plate 214D to surround portions of left and right horizontal sides of the body portion 212a of the first metal plate 212D and a top surface thereof.

Thus, according to this configuration of the present disclosure, since the accommodation groove 214h dented in the inner direction of the body portion is formed at the second metal plate 214D, the second metal plate 214D may be stably placed and coupled. In particular, when rolling the second metal plate 214D onto the body portion 212a of the first metal plate 212D, the second metal plate 214D may be fixed primarily on the body portion 212a of the body portion 212D before the second metal plate 214D is bonded in place, thereby facilitating the bonding process.

Moreover, compared with the module bus bar 210 of FIG. 3, the accommodation groove 214h may increase the contact area between the body portion 212a and the second metal plate 214D, thereby ensuring the high bonding force and reducing the electric resistance that may occur at the bonding portion.

Meanwhile, referring to FIG. 3 along with FIG. 3, the connection portion 212b of the first metal plate 212 may have a thickness T1 relatively thinner than the second metal plate 214. Here, the thickness T1 means a thickness T1 in a direction (vertical direction) in which the connection portion 212b faces the electrode terminal 111 of the cylindrical battery cell 100.

Specifically, it is appropriate that the connection portion 212b of the first metal plate 212 is rapidly melted during welding in order to be efficiently bonded to the electrode terminal 111 of the cylindrical battery cell 100. Meanwhile, the second metal plate 214 may serve as a current path for transmitting a current transferred from the cylindrical battery cell 100 to an external electronic device, instead of a portion where welding is performed. To this end, the second metal plate 214 needs to reduce the electric resistance in order to minimize a current loss in transmitting the current. Accordingly, it is appropriate that the second metal plate 214 has a larger sectional area at a side where current flows. That is, the power loss may be reduced more as the thickness T2 of the second metal plate 214 is greater.

For example, as shown in FIG. 3, in the module bus bar 210 of the present disclosure, the thickness T1 of the connection portion 212b of the first metal plate 212 may be relatively thinner than a thickness T2 of the second metal plate 214.

Thus, according to this configuration of the present disclosure, since the thickness T1 of the connection portion 212b of the first metal plate 212 is configured thin, the welding between the connection portion 212b and the electrode terminal 111 of the cylindrical battery cell 100 may be performed rapidly at a low process temperature. That is, during the resistance welding, as compared with the case where the connection portion is relatively thick, as the connection portion 212b is thinner, the connection portion 212b may be quickly melted at a lower temperature. Accordingly, the efficiency of the manufacturing process may be increased, and the failure of the cylindrical battery cell 100 according to the welding temperature may be minimized.

Figure 7:
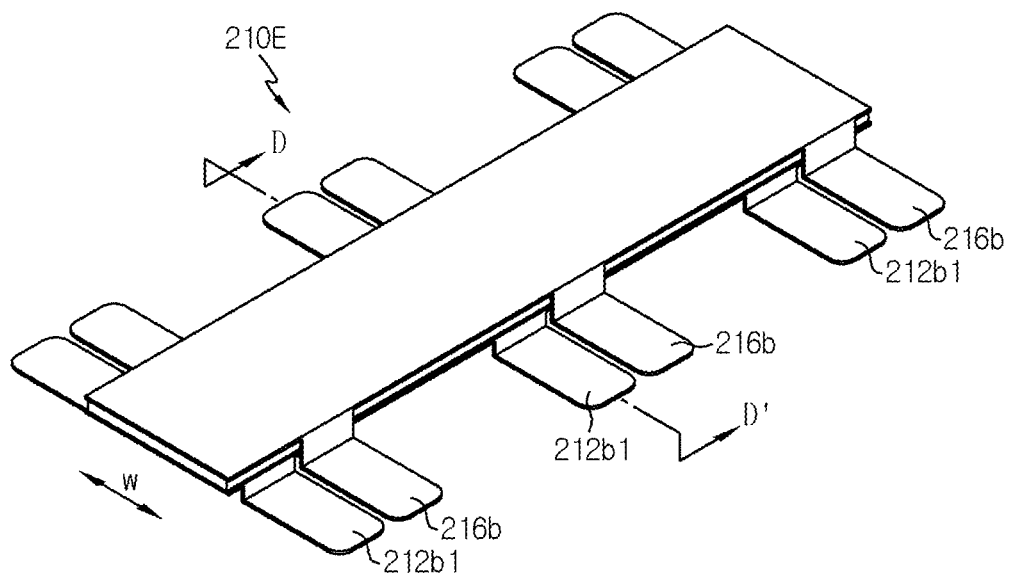
FIG. 7 is a perspective view schematically showing a module bus bar of the battery module according to still another embodiment of the present disclosure.

FIG. 7 is a perspective view schematically showing a module bus bar of the battery module according to still another embodiment of the present disclosure. Also, FIG. 8 is a schematic sectional view showing the module bus bar, taken along the line D-D' of FIG. 7.

Figure 8:
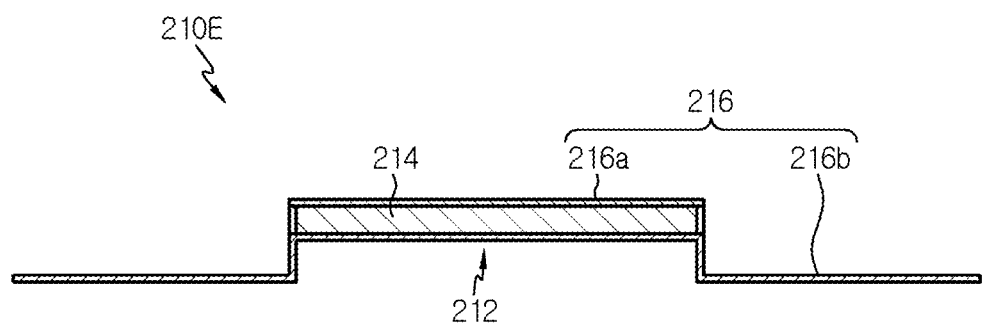
FIG. 8 is a schematic sectional view showing the module bus bar, taken along the line D-D' of FIG. 7.

Referring to FIGS. 7 and 8 along with FIG. 2, a module bus bar 210E according to another embodiment may further include a third metal plate 216. Specifically, the third metal plate 216 may have a bonding portion 216a bonded to an outer surface of the second metal plate 214. In addition, the bonding portion 216a may be located on the second metal plate 214. Further, the bonding portion 216a may be disposed between the plurality of cylindrical battery cells 100 arranged in two rows.

In addition, the third metal plate 216 may have a plurality of connection extensions 216b formed to extend in a horizontal direction w from one side of the bonding portion 216a. Further, each of the plurality of connection extensions 216b may be in contact with the electrode terminal 111 of each of the plurality of cylindrical battery cells 100.

Also, the third metal plate 216 may have a metal with a relatively lower electric conductivity than the second metal plate 214. For example, the third metal plate 216 may include a nickel material. Further, any metal alloy mainly containing nickel, aluminum, gold, silver, or the like may be applied to the third metal plate 216.

For example, as shown in FIG. 8, the module bus bar 210E of the present disclosure may include a first metal plate 212, a second metal plate 214, and a third metal plate 216. In this case, the first metal plate 212 and the third metal plate 216 may mainly include nickel. In addition, the second metal plate 214 may mainly include copper. That is, the second metal plate 214 may have a higher electric conductivity than the first metal plate 212 and the third metal plate 216. Further, the third metal plate 216 may have a bonding portion 216a bonded to the outer surface of the second metal plate 214 and a plurality of connection extensions 216b extending in a horizontal direction from one side of the bonding portion 216a.

Accordingly, according to this configuration of the present disclosure, since the module bus bar 210E according to another embodiment additionally includes the third metal plate 216, the body portion 212a of the first metal plate 212, the second metal plate 214, and the bonding portion 216a of the third metal plate 216 may be bonded by rolling. Accordingly, the bonding force between the metal plates of the module bus bar 210E is further improved, and the bonding area among the first metal plate 212 or the third metal plate 216 and the second metal plate 214 electrically connected to the cylindrical battery cell 100 is increased, thereby minimizing the electric resistance caused by bonding and reducing the current loss of the module bus bar 210E.

Referring to FIGS. 7 and 8 again, the module bus bar 210E according to another embodiment may have a connection portion 212b1 of the first metal plate 212, different from the connection portion 212b of the module bus bar 210 of FIG. 3. That is, in the module bus bar 210E, the connection extension 216b of the third metal plate 216 may be disposed to be spaced apart from the connection portion 212b1 by a predetermined distance. That is, the connection portion 212b1 of the first metal plate 212 and the connection extension 216b of the third metal plate 216 may be spaced apart by a predetermined distance and arranged parallel to each other in a horizontal direction.

Further, the connection portion 212b1 of the first metal plate 212 and the connection extension 216b of the third metal plate 216 may be disposed to be spaced apart by a predetermined distance. In addition, the spaced distance between the connection portion 212b1 of the first metal plate 212 and the connection extension 216b of the third metal plate 216 may be set to generate proper resistance heat when being resistance-welded to the electrode terminal 111 of the cylindrical battery cell 100.

Further, the connection portion 212b1 of the first metal plate 212 and the connection extension 216b of the third metal plate 216 may be made of the same material. For example, the connection portion 212b1 of the first metal plate 212 and the connection extension 216b of the third metal plate 216 may mainly include a nickel material.

Thus, according to this configuration of the present disclosure, if the connection portion 212b1 of the first metal plate 212 and the connection extension 216b of the third metal plate 216 are disposed to be spaced apart by a predetermined distance to be resistance-welded to the electrode terminal 111 of the cylindrical battery cell 100, when compared to a current path between two connection portions 212b1 of the first metal plate 212, a current path between the connection portion 212b1 of the first metal plate 212 and the connection extension 216b of the third metal plate 216 is longer and the electric resistance is higher, so that the current flow may be concentrated in the current path from the connection portion 212b1 of the first metal plate 212 to the electrode terminal 111 of the cylindrical battery cell 100 and the connection extension 216b of the third metal plate 216. Accordingly, the resistance welding between the module bus bar 210E and the electrode terminal may be efficiently performed. In addition, the manufacturing time may be shortened and the battery module 200 with excellent weldability may be manufactured.

Referring to FIGS. 1 and 3, the second metal plate 214 of the module bus bar 210A of another embodiment of the present disclosure may include a protrusion 214a configured to protrude outward from the body portion 212a of the first metal plate 212. Specifically, the protrusion 214a may have a coupling structure such that the external input/output terminal is coupled thereto. For example, the protrusion 214a may have a perforated fixing groove 214b into which the external input/output terminal (not shown) is inserted and coupled. In addition, the external input/output terminal may have a bolt shape that may be inserted into and fastened to the fixing groove 214b.

For example, as shown in FIG. 1, the protrusion 214a may be formed on two module bus bars 210A among six module bus bars 210A. In addition, each of the protrusions 214a may have the fixing groove 214b to which the external input/output terminal (not shown) is coupled.

Therefore, according to this configuration of the present disclosure, when the protrusion 214a is formed such that the external input/output terminal is coupled to the second metal plate 214 rather than the first metal plate 212, the power may be transmitted to an external electronic device through the second metal plate 214 with a higher electric conductivity than the first metal plate 212, thereby minimizing the loss of power supplied from the battery module 200. In addition, since the second metal plate 214 has more excellent heat dissipation characteristics than the first metal plate 212, the second metal plate 214 is more advantageous in dissipating the heat generated in the external input/output terminal to the outside.

Figure 9:
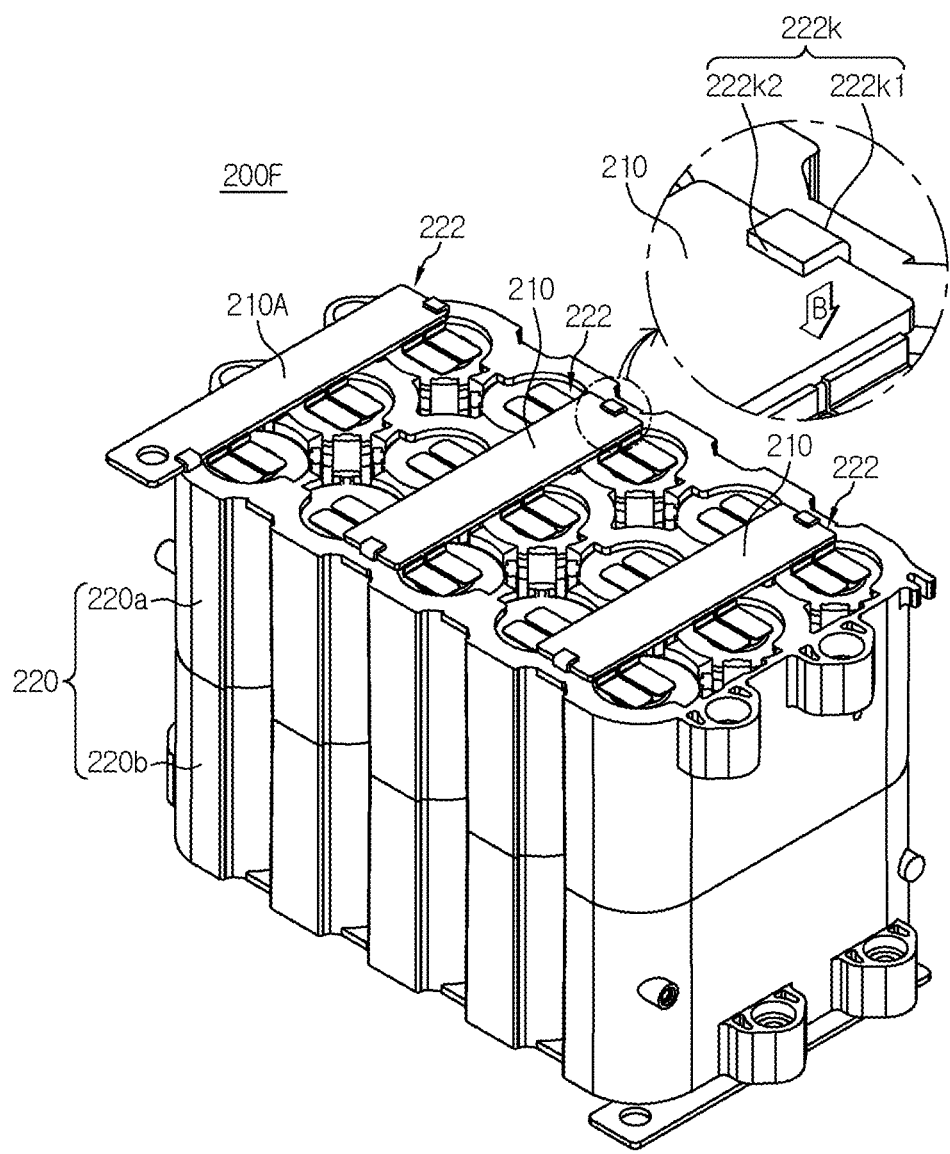
FIG. 9 is a perspective view schematically showing components of a battery module according to another embodiment of the present disclosure.

FIG. 9 is a perspective view schematically showing components of a battery module according to another embodiment of the present disclosure.

Referring to FIG. 9, a battery module 200F according to another embodiment of the present disclosure may have a mounting portion 222 formed at the module housing 220 so that the module bus bar 210 is mounted to an outer side thereof. Specifically, the mounting portion 222 to which the module bus bar 210 may be mounted may be formed at an upper surface or a lower surface of the module housing 220. That is, the mounting portion 222 to which the module bus bars 210, 210A may be respectively mounted may be formed between the plurality of cylindrical battery cells 100 accommodated in the module housing 220. In other words, the mounting portion 222 to which the module bus bars 210, 210A may be respectively mounted may be formed between two accommodation portions in which the plurality of cylindrical battery cells 100 of the module housing 220 are accommodated.

In addition, a hook structure 222k may be formed at the mounting portion 222 to press and fix the module bus bar 210 mounted on the mounting portion 222 inward. Specifically, the hook structure 222k may have a body portion 222k1 protrusively extending outward from the upper surface or the lower surface of the module bus bar 210, and a pressing portion 222k2 extending in the horizontal direction from an extending end of the body portion 222k1 to press the outer surface of the module bus bar 210.

Thus, according to this configuration of the present disclosure, the module bus bar 210 pressurized by the hook structure is stably fixed to maintain the structure bonded to the electrode terminals 111, 112 of the plurality of cylindrical battery cells 100. Moreover, it is possible to closely maintain the bonding state between the plurality of metal plates by the inward pressing force of the hook structure, thereby improving the durability of the module bus bar 210.

In addition, a battery pack (not shown) according to the present disclosure may include at least two of the battery modules 200. Specifically, the at least two battery modules 200 may be arranged in one direction. In some cases, the battery pack may further include a heatsink (not shown) for heat dissipation.

Also, an electronic device (not shown) according to the present disclosure may include the battery pack. For example, the battery pack may be accommodated in an external case of the electronic device. In addition, the electronic device may be a mobile means such as an electric bicycle or a power tool.

Meanwhile, referring to FIGS. 1 to 3 again, a method for manufacturing the module bus bar 210 according to the present disclosure may include a shaping step, a bonding step, and a punching step. Specifically, in the shaping step, the connection portion 212b configured to electrically connect plurality of cylindrical battery cells 100 and the body portion 212a of the first metal plate 212 extending in a direction along which the plurality of cylindrical battery cells 100 arranged may be shaped by rolling using a pressing roller (not shown).

In addition, in the bonding step, the second metal plate 214 with a higher electric conductivity than the first metal plate 212 may be rolled and bonded onto the body portion 212a of the first metal plate 212 at a predetermined temperature by cladding. At this time, the rolling may be performed using a common heat treatment method. For example, the heat treatment temperature may be set in the range from a room temperature to a temperature lower than a melting point of nickel and copper. More specifically, the predetermined temperature may be 100 □ to 500□. In addition, in the punching step, punching may be performed using a die (not shown) to form the connection portion 212b extending in a horizontal direction from the body portion 212a of the first metal plate 212. In this case, the die may be formed such that the connection portion 212b has a branched structure with a predetermined gap.

Thus, according to this configuration of the present disclosure, since the module bus bar 210 is configured such that the first metal plate 212 and the second metal plate 214 are bonded to each other by cladding, two advantages may be obtained over a bus bar made of a single metal plate. That is, the first metal plate 212 configured to be bonded to the plurality of cylindrical battery cells 100 has a metal with a relatively low electric conductivity than the second metal plate 214 and has a low heat dissipation property, thereby ensuring easy welding. In addition, since the second metal plate 214 includes a metal with a relatively higher electric conductivity than the first metal plate 212, the current supplied from the plurality of cylindrical battery cells 100 may be transmitted with a minimized power loss.

In addition, since the module bus bar 210 is configured such that the first metal plate 212 and the second metal plate 214 are bonded to each other by cladding (metal mingling), the electric resistance generated at the bonding portion thereof may be minimized.

Meanwhile, referring to FIG. 4 again, in the shaping step, the coupling protrusion 212p formed at the second metal plate 214 to protrude toward the first metal plate 212 may be inserted into and coupled to the body portion 212a of the first metal plate 212.

In this case, the coupling protrusion 212p may have an uneven structure. However, the shape of the coupling protrusion 212p is not limited to the uneven structure, and any shape may be applied as long as the coupling protrusion 212p may be inserted into and fixed to the body portion 212a of the first metal plate 212B to increase the coupling force therebetween.

Further, the coupling groove 212h dented inward may be formed at the body portion 212a of the first metal plate 212 so that the coupling protrusion 212p is inserted and fixed therein. Specifically, the coupling groove 212h may have a dented structure corresponding to the outer shape of the coupling protrusion 212p.

Thus, according to this configuration of the present disclosure, since the coupling protrusion 212p is formed on the outer surface of the second metal plate 214 and the coupling groove 212h is formed at the body portion 212a of the first metal plate 212, the second metal plate 214 may be bonded to the body portion 212a of the first metal plate 212 with a strong bonding force. Further, metal mingling may be relatively well achieved at the bonding portion of the second metal plate 214 and the body portion 212a of the first metal plate 212.

Meanwhile, referring to FIGS. 1 and 3 again, the manufacturing method may further include a forming step of forming the fixing groove 214 of the second metal plate 214 by punching using a die (not shown).

Specifically, the second metal plate 214 may have the protrusion 214a elongated to protrude outward from the body portion 212a of the first metal plate 212. In addition, the protrusion 214a may be shaped to form the fixing groove 214 perforated so that an external input/output terminal is inserted therein.

Thus, according to this configuration of the present disclosure, if the protrusion 214a is formed such that the external input/output terminal is coupled to the second metal plate 214 rather than the first metal plate 212, the power may be transmitted to an external electronic device through the first metal plate 212 with a higher electric conductivity, thereby minimizing the loss of power supplied from the battery module 200. In addition, since the second metal plate 214 has more excellent heat dissipation characteristics than the first metal plate 212, the second metal plate 214 is more advantageous in dissipating the heat generated in the external input/output terminal to the outside.

Meanwhile, even though the terms indicating directions such as upper, lower, left, right, front and rear directions are used in the specification, it is obvious to those skilled in the art that these merely represent relative positions for convenience in explanation and may vary based on a position of an observer or an object.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

REFERENCE SIGNS

| | |
|---|---|
| 200: battery module | 210: module bus bar |
| 100: cylindrical battery cell | 220: module housing |
| 220s1, 220s2: accommodation portion | |
| 111, 112: electrode terminal | 212: first metal plate |
| 214: second metal plate | 216: third metal plate |
| 220a, 220b: upper case, lower case | 212a, 212b: body portion, connection portion |
| 212p, 212h: coupling protrusion, coupling groove | 212i: insert portion |
| 212w: support wall | 214h: accommodation groove |
| 216a, 216b: bonding portion, connection extension | |
| 214a, 214b: protrusion, fixing groove | |
| 222: mounting portion | 222k: hook structure |

INDUSTRIAL APPLICABILITY

The present disclosure relates to a battery module including a module bus bar. In addition, the present disclosure may be used in industries related to a battery pack and a device equipped with the battery module.

What is claimed is:

1. A battery module, comprising:
a plurality of cylindrical battery cells respectively having electrode terminals at an upper portion and a lower portion thereof;
a module housing including an accommodation portion having a plurality of hollow structures in which the plurality of cylindrical battery cells are accommodated; and
a module bus bar including a first metal plate having a body portion at an upper portion or a lower portion of the plurality of cylindrical battery cells to extend in a horizontal direction and a plurality of connection portions configured to extend in a horizontal direction from one side of the body portion to contact the electrode terminals of the plurality of cylindrical battery cells, and a second metal plate bonded to the body portion of the first metal plate and having a metal with a relatively higher electric conductivity than the first metal plate,
wherein a coupling protrusion protruding toward the body portion of the first metal plate is at an outer surface of the second metal plate facing the body portion of the first metal plate,
wherein a coupling groove dented inward is at the body portion of the first metal plate so that the coupling protrusion is inserted and fixed therein, and
wherein the second metal plate has a protrusion configured to protrusively extend outward from the body portion of the first metal plate, and a fixing groove is at the protrusion so that an external input/output terminal is inserted and fixed therein.

2. The battery module according to claim 1,
wherein the second metal plate is bonded to the body portion of the first metal plate by cladding.

3. The battery module according to claim 1,
wherein an insert portion having a support wall protruding outward is at the body portion of the first metal plate so that at least a portion of the second metal plate is inserted therein.

4. The battery module according to claim 1,
wherein each connection portion of the first metal plate has a relatively smaller thickness than the second metal plate.

5. The battery module according to claim 1,
wherein the module housing has a mounting portion at an outer side thereof so that the module bus bar is mounted thereto, and
wherein a hook structure is at the mounting portion to press and fix the module bus bar mounted on the mounting portion inward.

6. A battery pack, comprising at least two battery modules according to claim 1.

7. A device, comprising the battery pack according to claim 6.

8. A battery module, comprising:
a plurality of cylindrical battery cells respectively having electrode terminals at an upper portion and a lower portion thereof;
a module housing including an accommodation portion having a plurality of hollow structures in which the plurality of cylindrical battery cells are accommodated; and
a module bus bar including a first metal plate having a body portion at an upper portion or a lower portion of the plurality of cylindrical battery cells to extend in a horizontal direction and a plurality of connection portions configured to extend in a horizontal direction from one side of the body portion to contact the electrode terminals of the plurality of cylindrical battery cells, and a second metal plate bonded to the body portion of the first metal plate and having a metal with a relatively higher electric conductivity than the first metal plate, wherein an accommodation groove dented in an inner direction of the body portion is at the second metal plate to surround at least a portion of the body portion of the first metal plate.

9. A battery module, comprising:

a plurality of cylindrical battery cells respectively having electrode terminals at an upper portion and a lower portion thereof;

a module housing including an accommodation portion having a plurality of hollow structures in which the plurality of cylindrical battery cells are accommodated; and a module bus bar including a first metal plate having a body portion at an upper portion or a lower portion of the plurality of cylindrical battery cells to extend in a horizontal direction and a plurality of connection portions configured to extend in a horizontal direction from one side of the body portion to contact the electrode terminals of the plurality of cylindrical battery cells, and a second metal plate bonded to the body portion of the first metal plate and having a metal with a relatively higher electric conductivity than the first metal plate, wherein the module bus bar further includes a third metal plate having a bonding portion bonded to an outer surface of the second metal plate and a plurality of connection extensions extending in a horizontal direction from one side of the bonding portion to contact the electrode terminals of the plurality of cylindrical battery cells.

10. A battery module according to claim 9, wherein the connection portion of the first metal plate and the connection extension of the third metal plate are spaced apart by a predetermined distance.

11. A battery module, comprising:

a plurality of cylindrical battery cells respectively having electrode terminals at an upper portion and a lower portion thereof;

a module housing including an accommodation portion having a plurality of hollow structures in which the plurality of cylindrical battery cells are accommodated; and a module bus bar including a first metal plate having a body portion at an upper portion or a lower portion of the plurality of cylindrical battery cells to extend in a horizontal direction and a plurality of connection portions configured to extend in a horizontal direction from one side of the body portion to contact the electrode terminals of the plurality of cylindrical battery cells, and a second metal plate bonded to the body portion of the first metal plate and having a metal with a relatively higher electric conductivity than the first metal plate, wherein the second metal plate has a protrusion configured to protrusively extend outward from the body portion of the first metal plate, and a fixing groove is at the protrusion so that an external input/output terminal is inserted and fixed therein.

12. A battery module, comprising:

a plurality of cylindrical battery cells respectively having electrode terminals at an upper portion and a lower portion thereof;

a module housing including an accommodation portion having a plurality of hollow structures in which the plurality of cylindrical battery cells are accommodated; and a module bus bar including a first metal plate having a body portion at an upper portion or a lower portion of the plurality of cylindrical battery cells to extend in a horizontal direction and a plurality of connection portions configured to extend in a horizontal direction from one side of the body portion to contact the electrode terminals of the plurality of cylindrical battery cells, and a second metal plate bonded to the body portion of the first metal plate and having a metal with a relatively higher electric conductivity than the first metal plate, wherein the module housing has a mounting portion at an outer side thereof so that the module bus bar is mounted thereto, and wherein a hook structure is at the mounting portion to press and fix the module bus bar mounted on the mounting portion inward.

* * * * *